United States Patent
Sasaki et al.

(10) Patent No.: US 11,208,930 B2
(45) Date of Patent: Dec. 28, 2021

(54) EXHAUST GAS PURIFICATION APPARATUS

(71) Applicant: SUBARU CORPORATION, Tokyo (JP)

(72) Inventors: Yasuyoshi Sasaki, Tokyo (JP); Isao Tan, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/948,001

(22) Filed: Aug. 27, 2020

(65) Prior Publication Data

US 2021/0095589 A1 Apr. 1, 2021

(30) Foreign Application Priority Data

Sep. 30, 2019 (JP) .............................. JP2019-180114

(51) Int. Cl.
*F01N 3/08* (2006.01)
*F01N 3/28* (2006.01)
*F01N 3/10* (2006.01)

(52) U.S. Cl.
CPC ......... *F01N 3/2807* (2013.01); *F01N 3/0814* (2013.01); *F01N 3/0842* (2013.01); *F01N 3/101* (2013.01); *F01N 2250/12* (2013.01); *F01N 2370/02* (2013.01); *F01N 2570/10* (2013.01); *F01N 2570/12* (2013.01); *F01N 2570/14* (2013.01)

(58) Field of Classification Search
CPC ...... F01N 3/2807; F01N 3/101; F01N 3/0842; F01N 3/0814; F01N 2250/12; F01N 2570/14; F01N 2370/02
See application file for complete search history.

(56) References Cited

U.S. PATENT DOCUMENTS

| 6,499,294 B1 * | 12/2002 | Katoh .................. F01N 13/009 60/301 |
| 7,922,988 B2 * | 4/2011 | Deeba ................ B01D 53/9472 423/213.2 |
| 2006/0272316 A1 * | 12/2006 | Miyashita ............. F01N 13/011 60/282 |
| 2009/0031706 A1 * | 2/2009 | Miyashita ................. F01N 9/00 60/285 |
| 2009/0199543 A1 * | 8/2009 | Sawada ................. F01N 11/007 60/276 |

(Continued)

FOREIGN PATENT DOCUMENTS

JP 2010-253447 A 11/2010

*Primary Examiner* — Matthew T Largi
(74) *Attorney, Agent, or Firm* — Troutman Pepper Hamilton Sanders LLP

(57) ABSTRACT

An exhaust gas purification apparatus includes a three-way catalyst. The three-way catalyst includes a downstream catalyst layer and an upstream catalyst layer. The downstream catalyst layer is to be provided in an exhaust pipe. The downstream catalyst layer contains a noble metal material containing at least one of Pd, Rh, or Pt, and an OSC material containing at least ceria. The upstream catalyst layer is to be provided in the exhaust pipe closer to an engine than the downstream catalyst layer is. The upstream catalyst layer contains the noble metal material and the OSC material. The upstream catalyst layer contains the ceria at a content less than a content of the ceria in the downstream catalyst layer.

11 Claims, 4 Drawing Sheets

(56) References Cited

U.S. PATENT DOCUMENTS

| | | | |
|---|---|---|---|
| 2009/0277160 A1* | 11/2009 | Katoh | F01N 3/0871 |
| | | | 60/286 |
| 2011/0041486 A1* | 2/2011 | Kato | B01J 23/63 |
| | | | 60/299 |
| 2012/0040824 A1 | 2/2012 | Itou et al. | |
| 2018/0264409 A1* | 9/2018 | Suzuki | B01J 35/002 |

* cited by examiner

EXHAUST GAS PURIFICATION APPARATUS

CROSS-REFERENCE TO RELATED APPLICATIONS

The present application claims priority from Japanese Patent Application No. 2019-180114 filed on Sep. 30, 2019, the entire contents of which are hereby incorporated by reference.

BACKGROUND

The disclosure relates to an exhaust gas purification apparatus including a three-way catalyst.

Vehicles have three-way catalysts in their exhaust pipes to remove hydrocarbon (HC), carbon monoxide (CO), and nitrogen oxide ($NO_x$) contained in exhaust gas (for example, Japanese Unexamined Patent Application Publication No. 2010-253447). The three-way catalyst oxidizes hydrocarbon into water and carbon dioxide ($CO_2$), oxidizes carbon monoxide into carbon dioxide, and reduces nitrogen oxide into nitrogen ($N_2$).

SUMMARY

An aspect of the disclosure provides an exhaust gas purification apparatus including a three-way catalyst. The three-way catalyst includes a downstream catalyst layer and an upstream catalyst layer. The downstream catalyst layer is to be provided in an exhaust pipe. The downstream catalyst layer contains a noble metal material containing at least one of Pd, Rh, or Pt, and an OSC material containing at least ceria. The upstream catalyst layer is to be provided in the exhaust pipe closer to an engine than the downstream catalyst layer is. The upstream catalyst layer contains the noble metal material and the OSC material. The upstream catalyst layer contains the ceria at a content less than a content of the ceria in the downstream catalyst layer.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

There is a demand for a technology in which the removal rate of hydrocarbon out of hydrocarbon, carbon monoxide, and nitrogen oxide can be improved.

It is desirable to provide an exhaust gas purification apparatus in which the removal rate of hydrocarbon can be improved.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

[Engine System 100]

Figure 1:
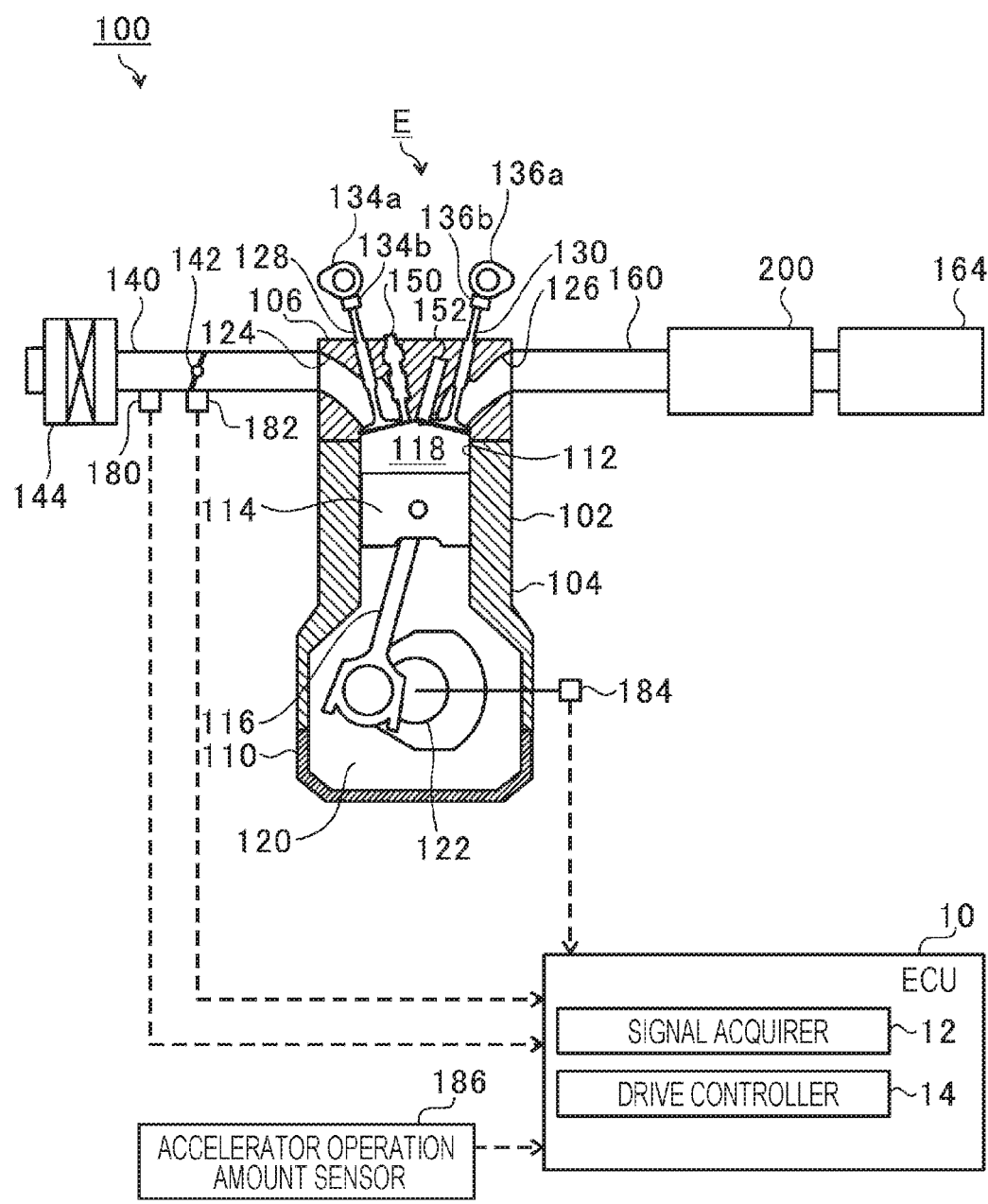
FIG. 1 is an explanatory diagram of an engine system according to an embodiment.

FIG. 1 is an explanatory diagram of an engine system 100 according to this embodiment. In FIG. 1, signal flows are represented by dashed arrows.

As illustrated in FIG. 1, the engine system 100 to be mounted on a vehicle includes an engine control unit (ECU) 10. The ECU 10 is a microcomputer including a central processing unit (CPU), a read-only memory (ROM) that stores programs and the like, and a random-access memory (RAM) serving as a working area. The ECU 10 controls an overall engine E. The following description is directed to details of structures and processing operations relating to this embodiment. Description is omitted for structures and processing operations that do not relate to this embodiment.

The engine E of the engine system 100 includes a cylinder block 102, a crankcase 104, a cylinder head 106, and an oil pan 110. The crankcase 104 is permanently joined to the cylinder block 102. The cylinder head 106 is joined to the cylinder block 102 opposite the crankcase 104. The oil pan 110 is joined to the crankcase 104 opposite the cylinder block 102.

The cylinder block 102 has a plurality of cylinder bores 112. In each of the plurality of cylinder bores 112, a piston 114 is slidably supported by a connecting rod 116. The engine E has a combustion chamber 118, which is a space enclosed by the cylinder bore 112, the cylinder head 106, and the top surface of the piston 114.

The engine E has a crank chamber 120, which is a space enclosed by the crankcase 104 and the oil pan 110. In the crank chamber 120, a crankshaft 122 is rotatably supported and the pistons 114 are coupled to the crankshaft 122 via the connecting rods 116.

The cylinder head 106 has an intake port 124 and an exhaust port 126 communicating with the combustion chamber 118. The distal end (disc) of an intake valve 128 is located between the intake port 124 and the combustion chamber 118. The distal end (disc) of an exhaust valve 130 is located between the exhaust port 126 and the combustion chamber 118.

An intake cam 134a, a rocker arm 134b, an exhaust cam 136a, and a rocker arm 136b are provided in a space enclosed by the cylinder head 106 and a head cover (not illustrated). The intake cam 134a fixed to an intake cam shaft abuts against the intake valve 128 via the rocker arm 134b. The intake valve 128 moves in its axial direction along with rotation of the intake cam shaft to open or close a space between the intake port 124 and the combustion chamber 118. The exhaust cam 136a fixed to an exhaust cam shaft abuts against the exhaust valve 130 via the rocker arm 136b. The exhaust valve 130 moves in its axial direction along with rotation of the exhaust cam shaft to open or close a space between the exhaust port 126 and the combustion chamber 118.

An intake pipe 140 including an intake manifold communicates with an upstream side of the intake port 124. A throttle valve 142 and an air cleaner 144 are provided in the intake pipe 140. The air cleaner 144 is located on an upstream side of the throttle valve 142. The throttle valve 142 is opened or closed by an actuator depending on the operation amount of an accelerator (not illustrated). Air cleaned by the air cleaner 144 is taken into the combustion chamber 118 through the intake pipe 140 and the intake port 124.

In the cylinder head 106, an injector 150 serving as a fuel injector is provided such that a fuel injection port is open to the combustion chamber 118. In the cylinder head 106, a spark plug 152 is provided such that its distal end is located in the combustion chamber 118. Fuel injected into the combustion chamber 118 from the injector 150 is mixed with air supplied into the combustion chamber 118 through the intake port 124 to become an air-fuel mixture. The spark plug 152 is turned ON at a predetermined timing to burn the air-fuel mixture produced in the combustion chamber 118. The burning causes the piston 114 to reciprocate and the reciprocation is converted into rotation of the crankshaft 122 through the connecting rod 116.

An exhaust pipe 160 including an exhaust manifold communicates with a downstream side of the exhaust port 126. An exhaust gas purification apparatus 200 is provided in the exhaust pipe 160. The exhaust gas purification apparatus 200 purifies exhaust gas from the exhaust port 126. The specific structure of the exhaust gas purification apparatus 200 is described later in detail. The exhaust gas purified by the exhaust gas purification apparatus 200 is discharged to the outside through a muffler 164.

The engine system 100 includes an intake air amount sensor 180, a throttle opening degree sensor 182, a crank angle sensor 184, and an accelerator operation amount sensor 186.

The intake air amount sensor 180 detects the amount of air taken into the engine E. The throttle opening degree sensor 182 detects the opening degree of the throttle valve 142. The crank angle sensor 184 detects the crank angle of the crankshaft 122. The accelerator operation amount sensor 186 detects the operation amount of the accelerator (not illustrated).

The intake air amount sensor 180, the throttle opening degree sensor 182, the crank angle sensor 184, and the accelerator operation amount sensor 186 are coupled to the ECU 10 and output signals indicating detection values to the ECU 10.

The ECU 10 controls the engine E by acquiring the signals output from the intake air amount sensor 180, the throttle opening degree sensor 182, the crank angle sensor 184, and the accelerator operation amount sensor 186. The ECU 10 serves as a signal acquirer 12 and a drive controller 14 to control the engine E.

The signal acquirer 12 acquires signals indicating values detected by the intake air amount sensor 180, the throttle opening degree sensor 182, the crank angle sensor 184, and the accelerator operation amount sensor 186. The signal acquirer 12 derives the rotational speed of the engine E (rotational speed of the crankshaft) based on the signal acquired from the crank angle sensor 184 and indicating the crank angle. The signal acquirer 12 derives a load of the engine E (engine load) based on the signal acquired from the intake air amount sensor 180 and indicating the intake air amount. Various existing technologies may be employed as a technology for determining the engine load based on the intake air amount and description thereof is therefore omitted herein.

The drive controller 14 controls the throttle valve actuator (not illustrated), the injector 150, and the spark plug 152 based on the signals acquired by the signal acquirer 12.

[Exhaust Gas Purification Apparatus 200]

Figure 2A:
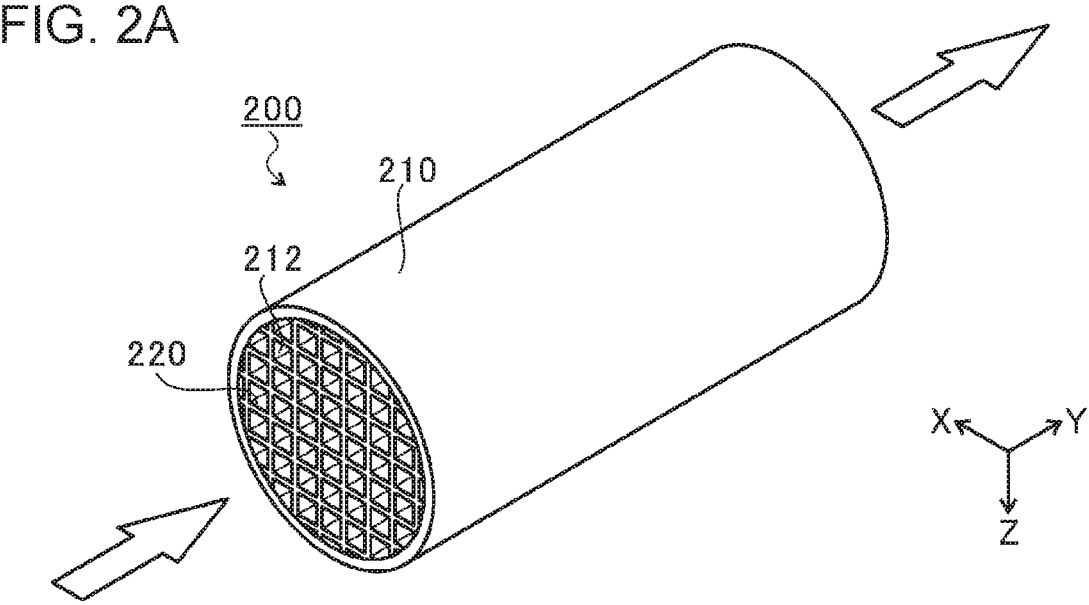
FIG. 2A and FIG. 2B are explanatory diagrams of the structure of an exhaust gas purification apparatus according to the embodiment.
Figure 2B:
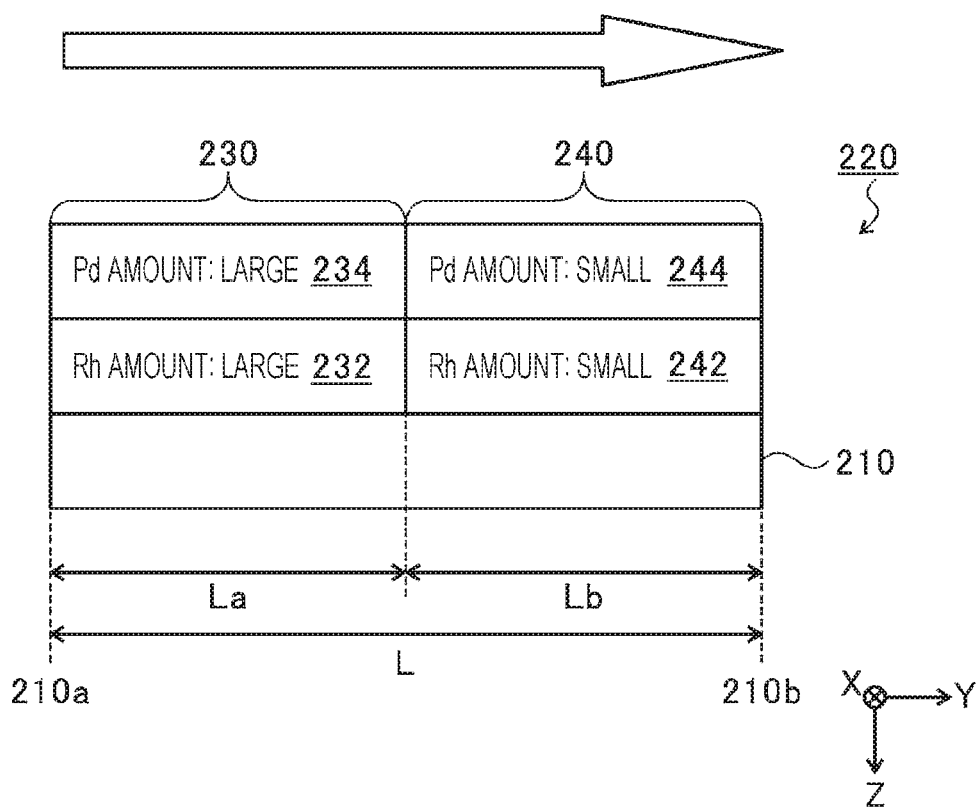

FIG. 2A and FIG. 2B are explanatory diagrams of the structure of the exhaust gas purification apparatus 200 according to this embodiment. FIG. 2A is a perspective view of the exhaust gas purification apparatus 200. FIG. 2B is an explanatory diagram of a concept of a three-way catalyst 220 of the exhaust gas purification apparatus 200. In FIG. 2A and FIG. 2B, the outline arrow represents a flow of exhaust gas. In this embodiment, an X axis, a Y axis (direction in which exhaust gas flows and in which the exhaust pipe 160 extends), and a Z axis orthogonal to one another are defined as in FIG. 2A and FIG. 2B.

As illustrated in FIG. 2A, the exhaust gas purification apparatus 200 includes a support 210 having a honeycomb structure with a plurality of cells 212, and the three-way catalyst 220 supported by the support 210. The three-way catalyst 220 removes hydrocarbon, carbon monoxide, and nitrogen oxide contained in exhaust gas.

As illustrated in FIG. 2B, the three-way catalyst 220 includes an upstream catalyst layer 230 and a downstream catalyst layer 240.

The upstream catalyst layer 230 contains a noble metal material, an oxygen storage capacity (OSC) material, and alumina ($Al_2O_3$). The noble metal material contains palladium (Pd) and rhodium (Rh). The OSC material contains a ceria (cerium oxide (IV); $CeO_2$)-zirconia (zirconium dioxide; $ZrO_2$) complex. Ceria has an oxygen storage capacity.

In this embodiment, the upstream catalyst layer 230 includes an upstream bottom layer 232 and an upstream top layer 234. The upstream bottom layer 232 is stacked on the support 210. The upstream bottom layer 232 contains at least Rh. The upstream top layer 234 is stacked on the upstream bottom layer 232. The upstream top layer 234 contains at least Pd.

The downstream catalyst layer 240 is provided in the exhaust pipe 160 on a downstream side of the upstream catalyst layer 230 in the direction in which exhaust gas flows. In other words, the downstream catalyst layer 240 is provided closer to the muffler 164 than the upstream catalyst layer 230 is. Alternatively, the upstream catalyst layer 230 is provided closer to the engine E than the downstream catalyst layer 240 is. The downstream catalyst layer 240 contains a noble metal material, an OSC material, and alumina.

In this embodiment, the downstream catalyst layer 240 includes a downstream bottom layer 242 and a downstream top layer 244. The downstream bottom layer 242 is stacked on the support 210. The downstream bottom layer 242 contains at least Rh. The downstream top layer 244 is stacked on the downstream bottom layer 242. The downstream top layer 244 contains at least Pd.

As described above, Pd is contained in the upstream top layer 234 and the downstream top layer 244 of the three-way catalyst 220. Pd is superior to Rh in terms of removal of hydrocarbon. Therefore, Pd is contained in the upstream top layer 234 and the downstream top layer 244 where exhaust gas first comes into contact. Thus, oxidation of hydrocarbon can be initiated at the upstream top layer 234 and the downstream top layer 244. The oxidation initiated at the upstream top layer 234 and the downstream top layer 244 is succeeded by oxidation at the upstream bottom layer 232 and the downstream bottom layer 242. Thus, the three-way catalyst 220 can efficiently remove hydrocarbon contained in exhaust gas.

The upstream bottom layer 232 and the downstream bottom layer 242 contain Rh. Thus, the three-way catalyst 220 can efficiently remove nitrogen oxide contained in exhaust gas. The melting point of Rh is higher than the melting point of Pd. Therefore, Rh is unlikely to degrade by heat. Since the three-way catalyst 220 contains Rh, the thermal degradation of the three-way catalyst 220 can be suppressed.

A length La of the upstream catalyst layer 230 is 30% or more and 70% or less as large as a total length L of the support 210. The length La of the upstream catalyst layer 230 is a length from an upstream end 210a of the support 210. A length Lb of the downstream catalyst layer 240 is 30% or more and 70% or less as large as the total length L of the support 210. The length Lb of the downstream catalyst layer 240 is a length from a downstream end 210b of the support 210. For example, the length La of the upstream catalyst layer 230 and the length Lb of the downstream catalyst layer 240 are 50% as large as the total length L.

When the length La of the upstream catalyst layer 230 and the length Lb of the downstream catalyst layer 240 are less than 30% as large as the total length L, the upstream catalyst layer 230 and the downstream catalyst layer 240 are absent over a long range around the center of the support 210. Then, the purification rate of exhaust gas decreases in the three-way catalyst 220. When the length La of the upstream catalyst layer 230 and the length Lb of the downstream catalyst layer 240 are more than 70% as large as the total length L, the upstream catalyst layer 230 and the downstream catalyst layer 240 overlap each other over a long range around the center of the support 210. That is, the thickness of the three-way catalyst 220 increases over a long range around the center of the support 210. The channel is narrow in the region where the thickness of the three-way catalyst 220 increases. Therefore, the flow of exhaust gas may be limited and the power of the engine E may decrease.

For the reasons described above, the length La of the upstream catalyst layer 230 is 30% or more and 70% or less as large as the total length L of the support 210 and the length Lb of the downstream catalyst layer 240 is 30% or more and 70% or less as large as the total length L of the support 210. In this exhaust gas purification apparatus 200, the purification rate of exhaust gas can be improved and the decrease in the power of the engine E can be prevented.

Next, description is made of relationships between the upstream catalyst layer 230 and the downstream catalyst layer 240 in terms of the support density of the noble metal material and in terms of the content of ceria.

[Support Density of Noble Metal Material]

The support density (g/L) of the noble metal material in the upstream catalyst layer 230 is more than the support density of the noble metal material in the downstream catalyst layer 240. Thus, the exhaust gas purification apparatus 200 can purify exhaust gas at a lower temperature.

In this embodiment, the support density of Pd in the upstream top layer 234 is more than one time and less than three times as large as the support density of Pd in the downstream top layer 244. The support density of Rh in the upstream bottom layer 232 is more than one time and less than three times as large as the support density of Rh in the downstream bottom layer 242.

When the support density of Pd in the upstream top layer 234 is three times or more as large as the support density of Pd in the downstream top layer 244, the upstream top layer 234 may sinter to degrade by heat. Since the support density of Pd in the upstream top layer 234 is less than three times as large as the support density of Pd in the downstream top layer 244, the removal rate of hydrocarbon can be improved and the thermal degradation of the three-way catalyst 220 can be suppressed.

When the support density of Rh in the upstream bottom layer 232 is three times or more as large as the support density of Rh in the downstream bottom layer 242, the upstream bottom layer 232 may sinter to degrade by heat. Since the support density of Rh in the upstream bottom layer 232 is less than three times as large as the support density of Rh in the downstream bottom layer 242, the removal rate of hydrocarbon can be improved and the thermal degradation of the three-way catalyst 220 can be suppressed.

[Content of Ceria]

The content of ceria in the downstream catalyst layer 240 is more than the content of ceria in the upstream catalyst layer 230. Although hydrocarbon and carbon monoxide are oxidized in the three-way catalyst 220, carbon monoxide rather than hydrocarbon is selectively oxidized when the three-way catalyst 220 contains ceria. The content of ceria in the upstream catalyst layer 230 is less than the content of ceria in the downstream catalyst layer 240 because hydrocarbon is mainly oxidized in the upstream catalyst layer 230. In this exhaust gas purification apparatus 200, the removal rate of hydrocarbon can be improved while keeping the removal rate of carbon monoxide.

Figure 3A:
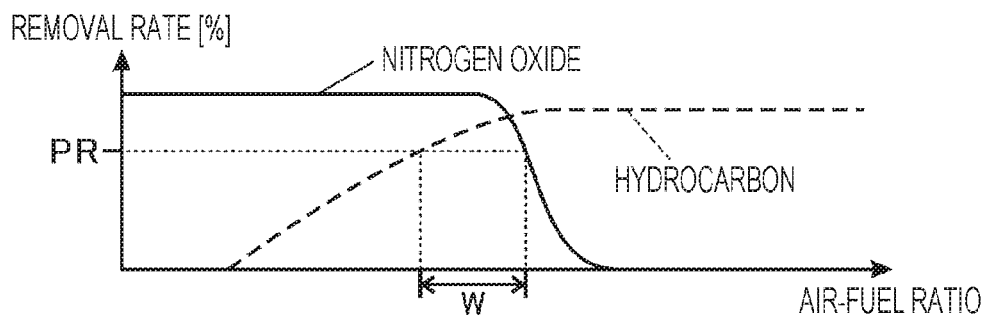
FIG. 3A and FIG. 3B are explanatory diagrams of the ratio of the content of ceria.
Figure 3B:
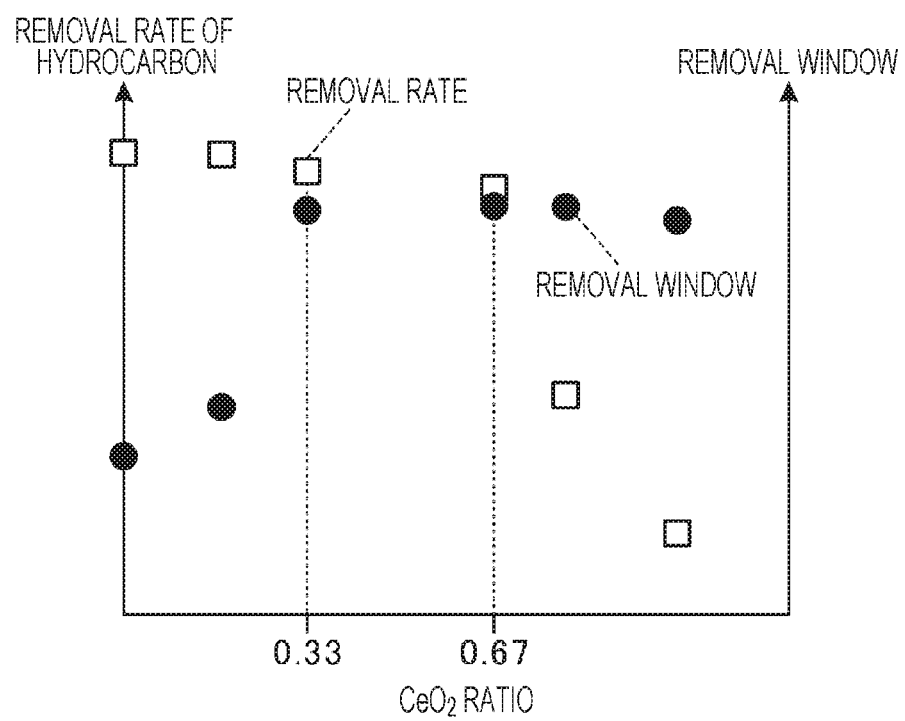

In this embodiment, the content of ceria in the upstream catalyst layer 230 is 0.33 times or more and 0.67 times or less as large as the content of ceria in the downstream catalyst layer 240. FIG. 3A and FIG. 3B are explanatory diagrams of the ratio of the content of ceria. FIG. 3A is an explanatory diagram of a removal window W. FIG. 3B is an explanatory diagram of the removal rate of hydrocarbon and the removal window W relative to the ratio of the content of ceria. In FIG. 3A, the solid line represents the removal rate of nitrogen oxide and the dashed line represents the removal rate of hydrocarbon. In FIG. 3B, the outline square represents the removal rate of hydrocarbon and the solid circle represents the width of the removal window W.

As illustrated in FIG. 3A, the removal rate [%] of nitrogen oxide is constant until the air-fuel ratio (A/F) reaches a predetermined air-fuel ratio. When the air-fuel ratio is more than the predetermined air-fuel ratio, the removal rate of nitrogen oxide decreases along with an increase in the air-fuel ratio. The removal rate [%] of hydrocarbon increases along with the increase in the air-fuel ratio until the air-fuel ratio reaches a predetermined air-fuel ratio. The removal rate of hydrocarbon is constant when the air-fuel ratio is equal to or more than the predetermined air-fuel ratio. The removal window W is a range of the air-fuel ratio in which the removal rate of nitrogen oxide and the removal rate of hydrocarbon are equal to or more than a predetermined removal rate PR.

As illustrated in FIG. 3B, when the ratio of ceria in the upstream catalyst layer 230 to ceria in the downstream catalyst layer 240 (content of ceria in upstream catalyst layer 230/content of ceria in downstream catalyst layer 240) is 0 or more and less than 0.33, the width (range) of the removal window W increases along with an increase in the ratio of ceria. When the ratio of ceria is 0.33 or more, the width of the removal window W is constant irrespective of the ratio of ceria. That is, the removal window W is narrow when the ratio of ceria is less than 0.33. Therefore, when the air-fuel ratio fluctuates, either one of the removal rate of hydrocarbon and the removal rate of nitrogen oxide may decrease.

When the ratio of ceria is 0 or more and 0.67 or less, the removal rate of hydrocarbon is constant irrespective of the ratio of ceria. When the ratio of ceria is more than 0.67, the removal rate of hydrocarbon decreases along with the increase in the ratio of ceria.

When the ratio of ceria is 0.33 or more and 0.67 or less, the removal rate of hydrocarbon can be increased and the width of the removal window W can be increased in the three-way catalyst 220. In this three-way catalyst 220, the removal rate of hydrocarbon and the removal rate of nitrogen oxide can be improved even if the air-fuel ratio fluctuates.

As described above, the removal rate of hydrocarbon can be improved in the exhaust gas purification apparatus 200 of this embodiment. In other words, the removal rate of hydrocarbon in the exhaust gas purification apparatus 200 can be kept at a level similar to that in the related art even if the temperature of exhaust gas decreases.

Modified Example

In the embodiment described above, the exhaust gas purification apparatus 200 does not have a $NO_x$ storage reduction catalyst. The exhaust gas purification apparatus may have the $NO_x$ storage reduction catalyst.

Figure 4:
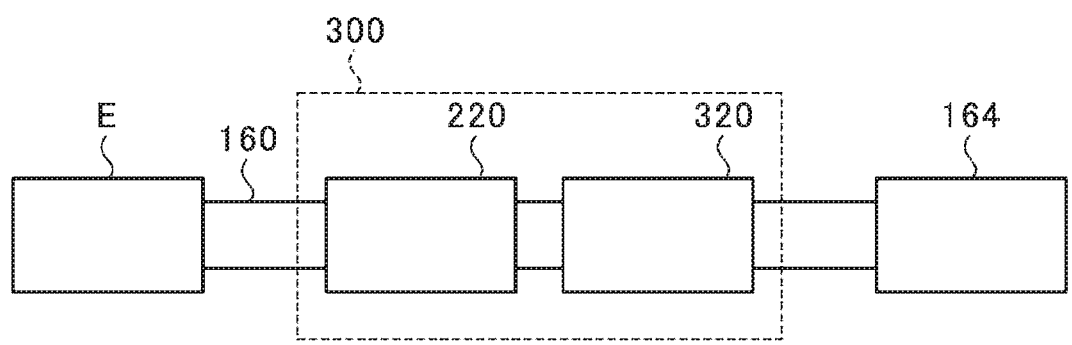
FIG. 4 is an explanatory diagram of an exhaust gas purification apparatus according to a modified example.

FIG. 4 is an explanatory diagram of an exhaust gas purification apparatus 300 according to a modified example. As illustrated in FIG. 4, the exhaust gas purification apparatus 300 includes the three-way catalyst 220 and a $NO_x$ storage reduction catalyst 320. Constituent elements equivalent to those of the exhaust gas purification apparatus 200 are represented by the same reference symbols to omit description thereof.

In the exhaust pipe 160, the $NO_x$ storage reduction catalyst 320 is provided closer to the muffler 164 than the three-way catalyst 220 (downstream catalyst layer 240) is. That is, the $NO_x$ storage reduction catalyst 320 is provided on a downstream side of the three-way catalyst 220 in the exhaust pipe 160. When the air-fuel ratio is more than a stoichiometric air-fuel ratio, that is, when the air-fuel mixture is lean, the $NO_x$ storage reduction catalyst 320 oxidizes nitrogen monoxide (NO) into nitrogen dioxide ($NO_2$) and stores the nitrogen dioxide. When the air-fuel ratio is less than the stoichiometric air-fuel ratio, that is, when the air-fuel mixture is rich, the $NO_x$ storage reduction catalyst 320 desorbs the stored nitrogen dioxide, reduces the nitrogen dioxide into nitrogen monoxide, and causes the nitrogen monoxide to react with hydrocarbon and carbon monoxide, thereby decomposing the hydrocarbon, the carbon monoxide, and the nitrogen monoxide.

That is, the $NO_x$ storage reduction catalyst 320 removes nitrogen monoxide (nitrogen oxide) by using carbon monoxide when the air-fuel mixture is rich. When the three-way catalyst 220 contains a large amount of ceria, the removal rate of carbon monoxide increases and the amount of carbon monoxide to be guided to the $NO_x$ storage reduction catalyst 320 decreases. Then, the removal rate of nitrogen oxide decreases in the $NO_x$ storage reduction catalyst 320 when the air-fuel mixture is rich.

Figure 5:
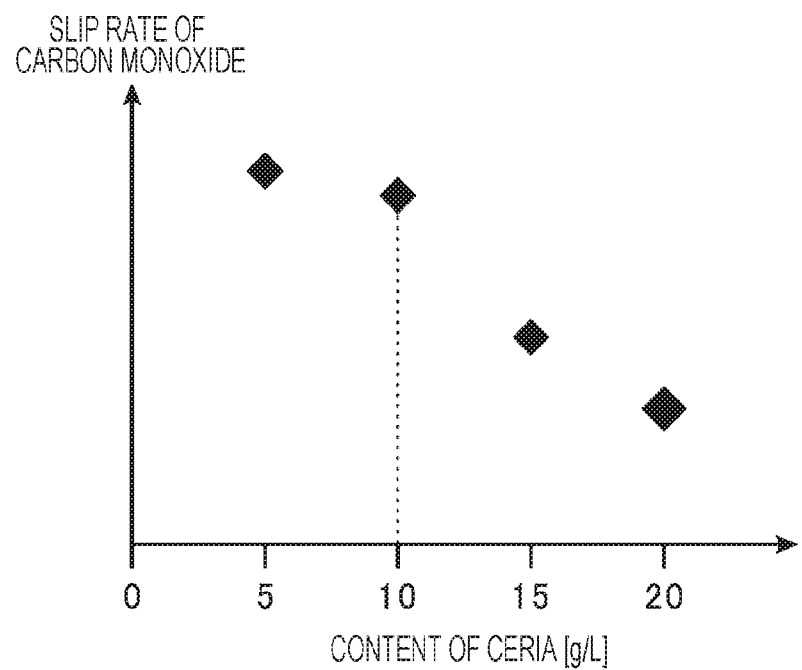
FIG. 5 is an explanatory diagram of the amount of ceria contained in a three-way catalyst and the passing rate of carbon monoxide.

FIG. 5 is an explanatory diagram of the amount of ceria contained in the three-way catalyst 220 and the passing rate of carbon monoxide. In FIG. 5, the vertical axis represents the proportion of carbon monoxide that passes through (slips out of) the three-way catalyst 220 (slip rate of carbon monoxide). In FIG. 5, the horizontal axis represents the content of ceria [g/L] in the three-way catalyst 220 per unit volume.

As illustrated in FIG. 5, the slip rate of carbon monoxide hardly changes when the content of ceria in the three-way catalyst 220 is more than 0 g/L and 10 g/L or less. When the content of ceria in the three-way catalyst 220 is more than 10 g/L, the slip rate of carbon monoxide decreases along with an increase in the amount of ceria.

For the reason described above, the content of ceria in the three-way catalyst 220 of the modified example is more than 0 g/L and 10 g/L or less. With this three-way catalyst 220, a predetermined amount of carbon monoxide can be guided to the $NO_x$ storage reduction catalyst 320. In this exhaust gas purification apparatus 300, the purification performance of the $NO_x$ storage reduction catalyst 320 can be improved.

Although the exemplary embodiment of the disclosure has been described above with reference to the accompanying drawings, the embodiment of the disclosure is not limited to the embodiment described above. It is understood that a person having ordinary skill in the art may conceive various modifications or revisions within the scope of claims and those modifications or revisions also belong to the technical scope of the embodiment of the disclosure.

In the embodiment and the modified example described above, the noble metal material contains Pd and Rh. The noble metal material may contain at least one of Pd, Rh, or platinum (Pt).

In the embodiment and the modified example described above, the upstream bottom layer 232 contains Rh and the upstream top layer 234 contains Pd. The upstream bottom layer 232 may contain Pd and the upstream top layer 234 may contain Rh. Similarly, the downstream bottom layer 242 may contain Pd and the downstream top layer 244 may contain Rh.

In the embodiment and the modified example described above, the OSC material contains the ceria-zirconia complex. The OSC material may contain at least ceria.

The invention claimed is:

1. An exhaust gas purification apparatus comprising a three-way catalyst, the three-way catalyst comprising:
   a downstream catalyst layer to be provided in an exhaust pipe, the downstream catalyst layer comprising a noble metal material containing at least one of Pd, Rh, or Pt, and an OSC material containing at least ceria; and
   an upstream catalyst layer to be provided in the exhaust pipe closer to an engine than the downstream catalyst layer is, the upstream catalyst layer comprising the noble metal material and the OSC material, the upstream catalyst layer containing the ceria at a content less than a content of the ceria in the downstream catalyst layer, wherein a support density of the noble metal material in the upstream catalyst layer is more than a support density of the noble metal material in the downstream catalyst layer.

2. The exhaust gas purification apparatus according to claim 1, wherein the content of the ceria in the upstream catalyst layer is 0.33 times or more and is 0.67 times or less as large as the content of the ceria in the downstream catalyst layer.

3. The exhaust gas purification apparatus according to claim 2, further comprising a $NO_x$ storage reduction catalyst to be provided in the exhaust pipe closer to a muffler than the downstream catalyst layer is,
   wherein the content of the ceria of the upstream catalyst layer in the three-way catalyst is more than 0 g/L and is 10 g/L or less.

4. The exhaust gas purification apparatus according to claim 2, wherein a support density of the noble metal material in the upstream catalyst layer is more than a support density of the noble metal material in the downstream catalyst layer.

5. The exhaust gas purification apparatus according to claim 2,
wherein the upstream catalyst layer comprises:
an upstream bottom layer stacked on a support and containing at least Rh; and
an upstream top layer stacked on the upstream bottom layer and containing at least Pd, and
wherein the downstream catalyst layer comprises:
a downstream bottom layer stacked on the support and containing at least Rh; and
a downstream top layer stacked on the downstream bottom layer and containing at least Pd.

6. The exhaust gas purification apparatus according to claim 5, wherein a support density of the Pd in the upstream top layer is more than one time and is less than three times as large as a support density of the Pd in the downstream top layer.

7. The exhaust gas purification apparatus according to claim 1, further comprising a $NO_x$ storage reduction catalyst to be provided in the exhaust pipe closer to a muffler than the downstream catalyst layer is,
wherein the content of the ceria of the upstream catalyst layer in the three-way catalyst is more than 0 g/L and is 10 g/L or less.

8. The exhaust gas purification apparatus according to claim 1,
wherein the upstream catalyst layer comprises:
an upstream bottom layer stacked on a support and containing at least Rh; and
an upstream top layer stacked on the upstream bottom layer and containing at least Pd, and
wherein the downstream catalyst layer comprises:
a downstream bottom layer stacked on the support and containing at least Rh; and
a downstream top layer stacked on the downstream bottom layer and containing at least Pd.

9. The exhaust gas purification apparatus according to claim 8, wherein a support density of the Pd in the upstream top layer is more than one time and is less than three times as large as a support density of the Pd in the downstream top layer.

10. The exhaust gas purification apparatus according to claim 9, wherein a support density of the Rh in the upstream bottom layer is more than one time and is less than three times as large as a support density of the Rh in the downstream bottom layer.

11. The exhaust gas purification apparatus according to claim 8, wherein a support density of the Rh in the upstream bottom layer is more than one time and is less than three times as large as a support density of the Rh in the downstream bottom layer.

* * * * *